United States Patent [19]

Harrington

[11] Patent Number: 4,509,194
[45] Date of Patent: Apr. 2, 1985

[54] APPARATUS FOR PRODUCING A CODE WORD

[75] Inventor: John A. Harrington, St. Paul, Minn.

[73] Assignee: Minnesota Mining and Manufacturing Company, St. Paul, Minn.

[21] Appl. No.: 416,138

[22] Filed: Sep. 9, 1982

[51] Int. Cl.³ .......................... G06K 9/00; H04N 1/00
[52] U.S. Cl. ........................................ 382/56; 358/261
[58] Field of Search ................... 358/260, 261; 382/56

[56] References Cited

U.S. PATENT DOCUMENTS

| | | | |
|---|---|---|---|
| 4,107,648 | 8/1978 | Frank | 358/261 |
| 4,228,467 | 10/1980 | de Loye et al. | 358/261 |
| 4,257,069 | 3/1981 | Murayama et al. | 358/261 |

Primary Examiner—Leo H. Boudreau
Attorney, Agent, or Firm—Donald M. Sell; James A. Smith; William D. Bauer

[57] ABSTRACT

An apparatus for producing a code word indicative of vertical correlations in color changes between scanned lines of an information bearing document. The apparatus comprises a memory and counter for storing and retrieving the color of picture elements in the prior scanned line from which correlation is determined. The apparatus further comprises a state machine which may produce an intermediate code word from data corresponding to only part of the picture elements being correlated and which remembers the data from other picture elements by moving from state to state.

8 Claims, 6 Drawing Figures

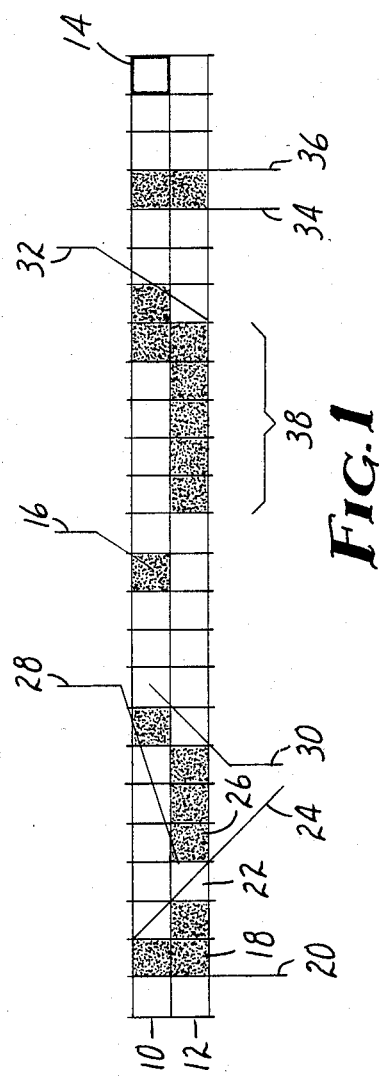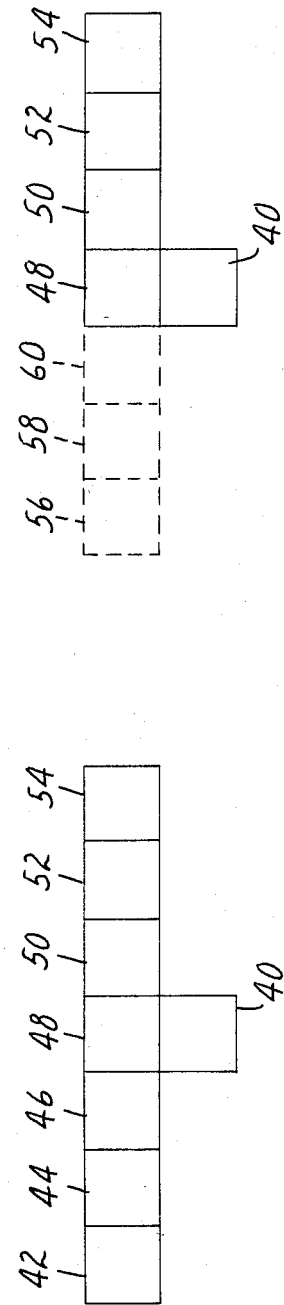

APPARATUS FOR PRODUCING A CODE WORD

BACKGROUND OF THE INVENTION

The present invention relates generally to apparatus for producing code words and relates more particularly to such apparatus where such apparatus is responsive to the binary information content in an information bearing document.

A primary environment in which the present invention finds use is with facsimile machines. Facsimile machines are useful for transmitting a document or picture from a first location to a second location over communication lines such as telephone lines without the necessity of physically transporting the document or picture. Such facsimile machines scan the information bearing document on a line-by-line basis. The Facsmile machines then produce a particular code indicative of the information content of the document or picture. The code (or subsequent result of that code) is then sent over communication lines, as for example telephone lines, to a similar facsimile machine. The second facsimile machine then interprets the code received and reproduces the original document or picture.

The scanning of the information bearing document, the definition of the transmitted codes, the transmission of the codes, and the printing of the copy of the document are all standard known elements in facsimile machines. The transmitted codes are defined by International Telegraph and Telephone Consultative Committee (CCITT) Specifications. All facsimile machines adhering to this specification can then decode the information and reconstruct the original information bearing document.

CCITT codes are transmitted between one of several varities of facsimile machines. The present invention is primarily involved with producing code words which can ultimately result in CCITT Group 3 codes or rather those codes required of a CCITT Group 3 facsimile machine. Group 3 codes are defined in two varieties; namely one dimensional (1D) codes and two dimensional (2D) codes. 1D Codes interpret the information content of one line, namely the current line, being scanned and the code produced is indicative of the serial run lengths of the information contained therein and result in Huffman codes being produced. 2D Codes interpret not only the current line but also are dependent upon the information content of a previous line, usually the previous line scanned.

2D Codes compress the information content of an information bearing document into a fewer number of bits than 1D codes resulting in decreased transmission times. While encoding a document containing printing or graphical information, on many occasions a vertical or other vertically correlated edge (or line) will be present in the document. In order to accurately reflect these vertical correlations, it is advantageous to compare the vertical correlation of a change in the binary information content of a current line with a change in the binary information content of a previous line (usually the prior line).

For purposes of the present invention the scanning of a document is accomplished on a line-by-line basis. Each line is divided into a predetermined number of elements called picture elements. The information bearing document or picture is scanned and encoded in a binary (i.e. black and white) basis. All discrete picture elements (PELs) are represented as either black or white (with representation in binary language of either a 1 or a 0). A change in the binary information content of the information bearing document is a change (black to white, e.g. 1 to 0, or white to black, e.g. 0 to 1) in the representation of the color (black or white) of the picture element currently being scanned (the current picture element) from the color (black or white) of the picture element of the last scanned picture element (prior picture element). Hence a color change refers to a change in the color (black and white) of the picture elements.

2D Codes represent encoding of the vertical correlation between a color change between picture elements in the current line with a color change between picture elements in a prior line, usually the previous line. Such vertical correlation may be exactly vertical or the correlation may be within a certain predetermined range of vertical. In a typical facsimile machine encoding situation, a "window" is defined by examining vertical correlation of within three horizontal (if the document is being scanned horizontally) picture elements. Thus the "vertical correlations" considered are a "vertical 0 (V0)" with a color change in a previous line exactly vertical with a color change in the current line, "vertical left 3 (VL3)" with a color change in a prior line occurring three elements to the left of a color change in the current line, and correspondingly a "vertical left 2 (VL2)", a "vertical left 1 (VL1)", a "vertical right 1 (VR1)", a "vertical right 2 (VR2)" and a "vertical right 3 (VR3)".

Further, 2D codes require the outputting of "run length codes" indicative of the number of picture elements without a color change when there is no vertical correlation within the predetermined window in a prior line, usually a previous line. For purposes of this invention, no vertical correlation means no vertical correlation within the predetermined window as specified above. This mode of operation is usually known as horizontal (when the document is scanned horizontally) run length mode (HRM).

The encoding apparatus or machine needs to consider therefore the current picture element (since it knows if a color change has just occurred), seven previous line picture elements (VL3, VL2, VL1, V0, VR1, VR2 and VR3) in addition to whether the coding is in horizontal run length mode (HRM). This makes the code produced combinationally dependent upon nine separate and independent inputs. A combinational logic circuit to produce a code word dependent upon these nine separate independent inputs would require a circuit capable of handling $2^9$ or 1,024 different combinations. A combinational logic element capable of these differing combinations would be complex and, more importantly, may be relatively slow due to the number of cascaded logic levels through the combinational circuit.

SUMMARY OF THE INVENTION

The present invention solves the problem of having a large combinational logic network to provide a code word for the CCITT Group 3 2D facsimile codes.

The present invention provides a state machine to limit the number of combinational inputs. Current combinational inputs are limited to the current picture element (CP), V0, VR1, VR2, VR3, and HRM, i.e. six combinational inputs. The state machine "knows" the other inputs, namely VL3, VL2, and VL1, based upon the machine state. The state machine remembers these inputs since during scanning of the prior current picture elements these inputs were contained within the V0-VR3 range of current inputs.

An apparatus for producing a code word is provided. The apparatus being responsive to the binary information content and an information bearing document defined by a predetermined number of picture elements in each of a plurality of horizontal lines in the document. The apparatus receives the binary information content sequentially from the picture elements in each one of the plurality of lines and sequentially through the plurality of lines. The code word is indicative of the vertical correlation between a change in the binary information content of sequential picture elements and a current one of the plurality of lines with a change in the binary information content of the picture elements in a prior one of the plurality of lines. The apparatus has a picture element counter receiving the binary information content of the information bearing document and for counting the predetermined number of picture elements being scanned. Further, a memory is operatively coupled to the picture element counter, the memory for storing the binary information content of the predetermined number of picture elements in the prior one of the plurality of lines. Further a state machine receives as inputs the binary information content of a current one of the predetermined number of picture elements and is operatively coupled to the memory. The state machine determines a change in the binary information content of the predetermined number of picture elements in the prior one of the plurality of lines and moves from state to state depending upon the vertical correlation of the change in binary information content in the prior one of the plurality of lines with a change in the binary information content in the line containing the current one of the predetermined number of picture elements. Further, the apparatus includes output means responsive to the state machine. The output means outputs the code word depending upon the vertical correlation of a change in the binary information content of the picture elements between the prior one of said plurality of lines and the line containing the current one of the predetermined number of picture elements.

In a preferred embodiment the state machine is responsive to a vertical correlation within a predetermined number of picture elements in the prior line defined as a window. In a further preferred embodiment the output means outputs a pass code indicative of the lack of vertical correlation and a change in the binary information content within the limits of the window. In a further preferred embodiment the output means outputs a run length code indicative of a vertical correlation of a change in the binary information content which is outside the limits of the window. Further in a preferred embodiment, the prior one of the plurality of lines is the line immediately sequentially preceeding the line containing the current one of the predetermined number of picture elements.

BRIEF DESCRIPTION OF THE DRAWINGS

The foregoing advantages, construction and operation of the present invention will become more readily apparent from the following description and accompanying drawings in which:

FIG. 1 illustrates examples of vertical correlation;

FIG. 2 illustrates an exemplary window of picture elements from which vertical correlations may be determined;

FIG. 3 illustrates an exemplary manner in which some picture elements are used as combinational inputs and some picture elements are determined by the state of the state machine;

DESCRIPTION OF THE PREFERRED EMBODIMENTS

Figure 4:
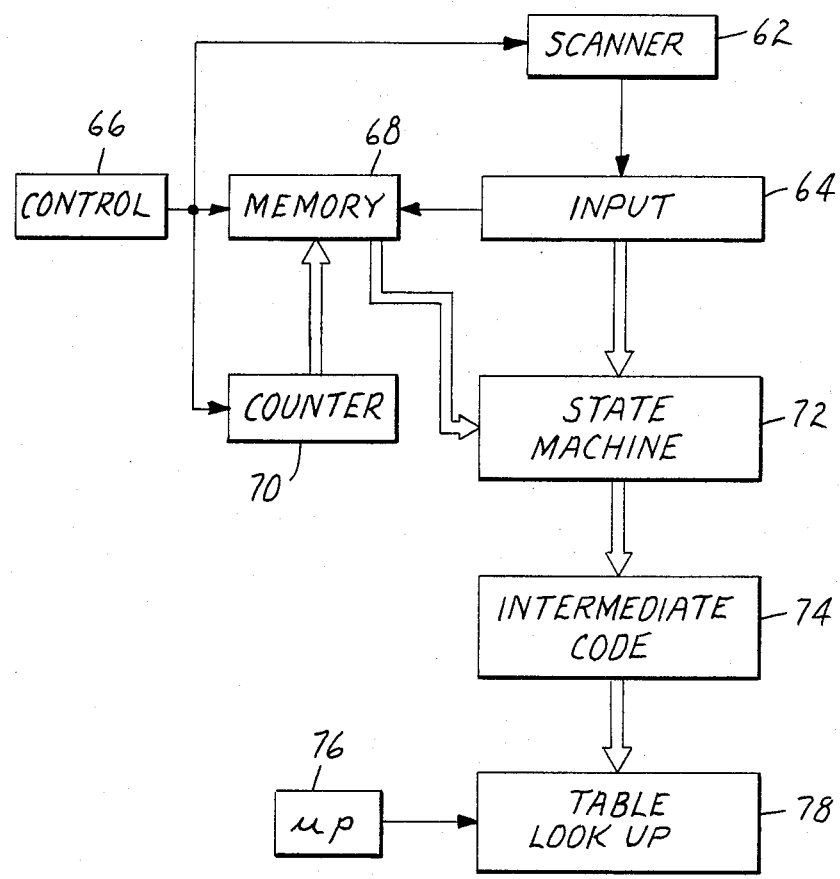
FIG. 4 is a block diagram of the apparatus of the present invention.

Vertical correlations between color changes in a current line and a previous line can be more easily described with reference to FIG. 1. FIG. 1 represents two lines 10 and 12 being scanned in an information bearing document. Each line is defined by a predetermined number of discrete picture elements as exemplified by picture element 14. It is assumed with reference to FIG. 1 that the document is being scanned horizontally, from left to right, first scanning line 10 and secondly scanning line 12. The colors in the information bearing document are represented by each discrete picture element 14 being black or white. As an example, picture element 14 is illustrated as being white in color while picture element 16 is illustrated as being black in color. Lines 10 and 12 are represented as being adjacent lines. For purposes of this example, it is assumed that the information bearing document is being scanned from left to right, top to bottom, therefore line 10 is scanned before line 12. In a general case, line 10 may be any prior line to line 12 and in a preferred embodiment, line 10 is in the immediately previous line to line 12.

While line 12 is being scanned in FIG. 1, several vertical correlations indicative of the correlations pertinent to the code words produced by the apparatus of the present invention are illustrated. Of course, it is recognized and understood that the correlations are vertical correlations only if the information bearing document is being scanned in the horizontal direction. Correspondingly, any particular correlation generally orthogonal to the direction of scanning is capable of being produced by the apparatus of the present invention. As line 12 is scanned and picture element 18 is encountered, a code word is output indicative of an exactly vertical correlation, namely a vertical 0 (V0) as illustrated by reference numeral 20. Continuing of the scanning of line 12, the next color change in line 12 occurs when picture element 22 is encountered. A code word is output at this time indicative of a vertical right 1 (VR1) correlation as evidenced by reference numeral 24. The next color change occurs when picture element 26 is reached and a code word is output indicative of a vertical left 3 (VL3) illustrated by reference numeral 28. Similarly, every time a color change occurs during the scanning of line 12 the picture elements contained in line 10 are examined to determine if a vertical correlation exists. In the example in FIG. 1, a vertical left 1 (VL1) is illustrated by reference numeral 30, another vertical left 1 (VL1) represented by reference numeral 32 and vertical 0 (V0) correlations are illustrated by reference numerals 34 and 36.

Where a color change occurs in line 10 (the previous line) without a corresponding color change in the current line as represented by picture element 16, the apparatus of the present invention, in a preferred embodiment, will output a "pass code" indicative of no discernible (i.e. within the predetermined window) vertical correlation between color changes in the comparative lines 10 and 12. Where a color change occurs in the current line for which no corresponding color change occurs in the prior line within a predetermined horizontal range, the apparatus of the present invention in a preferred embodiment will enter horizontal run length mode (HRM) and output a code indicative of the number of picture elements occurring before the next color change in the current line. This situation is illustrated in FIG. 1 by reference numeral 38.

The theoretical range of vertical correlations is bounded only by the number of picture elements in a single line. However, practically there is a limit due to the number of required inputs to the encoding apparatus. As the number of inputs expands, the complexity of the circuitry expands exponentially. In the CCITT Specification referenced earlier a range of vertical correlation from vertical left 3 (VL3) to vertical right 3 (VR3) is provided. This in effect creates a "window" as illustrated in FIG. 2. In order to properly output a code word indicative of a vertical left 3 to vertical right 3 vertical correlation, the encoding apparatus must know the state of the current picture element 40 and further must know the color of picture elements in the prior line in the range from three to the left to three to the right. These picture elements are illustrated in FIG. 2, as picture elements 42, 44, 46, 48, 50, 52 and 54. Thus, the window of current elements required for examination by an encoding apparatus capable of defining vertical correlations within the range of three to either the left or the right must include as inputs the current picture element 40 along with picture elements 42 through 54 in the prior line, or namely seven picture elements in the prior line along with the current picture element 40. In addition, as described above, if the current line being scanned has a color change without a corresponding color change within the window, the encoding apparatus may, in a preferred embodiment, enter the horizontal run length mode (HRM). Thus, in addition to the eight picture element inputs the encoding apparatus must know whether or not the apparatus is in horizontal run length mode (HRM). Thus for an encoding apparatus to combinationally determine the vertical correlations from three to the left to three to the right must include a nine input combinational circuit. Such a combinational circuit would have to consider $2^9$ or 1,024 separate possible combinations.

The utilization of the apparatus of the present invention including the state machine can cut down on the number of current combinational inputs required to achieve the same vertical correlation. This can be illustrated with reference to FIG. 3. FIG. 3 shows the same window as in FIG. 2 with an exception. The encoding apparatus of the present invention provides as current inputs the current picture element 40 along with picture elements from the previous line namely picture elements 48, 50, 52 and 54. Inputs from picture elements 48, 50, 52 and 54 will enable the encoding apparatus to determine the vertical 0 correlations as well as vertical right 1, vertical right 2 and vertical right 3 correlations. However, picture elements 42, 44 and 46 in FIG. 2 are not provided as current combinational inputs to the encoding apparatus of the present invention. Information from these picture elements is, of course, required to obtain vertical correlations from vertical right 1, vertical right 2 and vertical right 3. However, instead of providing this information as current combinational inputs, the encoding apparatus of the present invention obtains this information by the particular state in which the state machine of the present invention resides. The state machine of the encoding apparatus of the present invention knows the information contained in picture elements 42, 44 and 46 because these picture elements were contained within picture elements 48 through 54 during the scanning of prior current picture elements 40. By having as combinational inputs the encoding apparatus of the present invention is greatly reduced in complexity and increased in speed due to the necessity of having only six current inputs, namely the current picture element 40, prior picture elements 48 through 54 and the horizontal run length mode (HRM). Thus, the number of different combinational logic states is reduced to $2^6$, or namely 128 different combinations.

A block diagram of the apparatus to facilitate the modified window of FIG. 3 is illustrated in FIG. 4. A scanner 62 of conventional construction is used to scan the information bearing documents. The scanner 62 may transfer the binary information content of the information bearing document to input register 64 in either serial or parallel format. A control circuit, also of conventional design, controls the initiation of the scanner 62 and the transfer of the data to the input register 64. The information of the picture elements contained in input register 64 is transferred to a memory 68 which again may be of conventional design. The purpose of memory 68 is to store the data from the picture elements in the previous line being compared with the current picture element in the line being currently scanned. A counter 70, also of a conventional design, may be incremented each time data for a picture element is inserted into the memory 68. Data from the current picture element is transferred from input register 64 directly to state machine 72. Information concerning the prior picture elements, namely picture elements 48, 50, 52 and 54 in FIG. 3 are transmitted from the memory 68 to the state machine 72 as determined by the counter 70 which again is incremented as the scanning of each individual line occurs. Thus, state machine 72 receives as current inputs the current picture element 40 as in FIG. 3 and prior picture elements 48, 50, 52 and 54. Those current inputs along with the state machine's knowledge of the prior picture elements 56, 58 and 60 enable the state machine 72 to determine an output code word.

The particular code produced by the state machine 72 need not be the actual CCITT code specified under a given set of circumstances or inputs. The specified CCITT code varies from as little as one bit in length to as many as 13 bits of length in order to conserve transmission time and, hence transmission length. Thus, it is envisioned that the state machine 72 may produce an intermediate code word which may or may not be of fixed length. The intermediate code word may than be transmitted from state machine 72 to register 74. A table lookup procedure can then be utilized using standard state of the art microprocessor 76 and lookup table 78. This table lookup procedure can then be utilized to determine the final CCITT code. This procedure also has the advantage in being flexible, that is a change in the CCITT code requirements requires only an entry change in the lookup table. Further, variable length CCITT codes can easily be formatted in the lookup table. A microprocessor with well known techniques can be utilized to achieve the microprocessor control table lookup.

The state machine 72 is described with reference to the state diagram illustrated in FIGS. 5A and 5B. The circles in the state diagram illustrate the separate and independent states of the state machine 72. The rectangular blocks in the state diagram represent the formation of an intermediate code indicative of a particular vertical correlation or other event. Transitions between the circular states and the rectangular events are illustrated by a binary code, six bits in length. This six bit code is indicative of the six combinational inputs previously described for the state machine 72. The first bit in the code is indicative of the binary color of the current picture element 40. Bits two through five of the code are indicative of the binary color of prior picture elements 48, 50, 52 and 54, respectively. The sixth and last bit in the code represents the state of the horizontal run length mode (HRM). For purposes of describing the state diagram of FIGS. 5A and 5B, a binary 0 is indicative of a binary white color for a given picture element and a binary 1 is indicative of a binary black color for a given picture element. Further, a binary 0 in the sixth bit position indicates that the state machine 72 is not in horizontal run length mode while a binary 1 is indicative of the state machine 72 being in horizontal run length mode. The presence of a single asterisk next to a transition in the state diagram indicates that the counter 70 is to be incremented. The presence of a double asterisk in the state diagram is indicative of the forcing of the counter 70 to 0. Where no code is present next to a transition line, that transition unconditionally occurs. The states in the state diagram are identified by start white state 80, white vertical left 2 state 82, white vertical left 1 state 84, white vertical 0 state 86, white vertical right 1 state 88, white vertical right 2 state 90, and white vertical right 3 state 92. Where a single bit code is illustrated next to a transition line in the state diagram, that single bit code is indicative of the next current picture element encountered during the scanning process. Similarly where a two bit code is illustrated on a transition line, that two bit code is indicative of the next current picture element scanned during the scanning of the information bearing document and its associated prior picture element 48. Correspondingly, the black side of the state diagram contains states for start black 96, black vertical left 2 98, black vertical left 1 100, black vertical 0 102, black vertical right 1 104, black vertical right 2 106, black vertical right 3 108 and run length black 110. Transition state 112 is positioned between the white part and the black part of the diagram and serves as a collector for transitions between the black and white sides of the diagram.

When vertical left 3 block 114 is encountered the state machine 72 outputs the intermediate code word indicative of a vertical left 3 correlation. Similarly when vertical left 2 block 116 is encountered the state machine 72 outputs a vertical left 2 correlation. Similarly vertical left 1 block 118 is indicative of a vertical left 1 correlation and so on for vertical 0 block 120, vertical right 1 block 122, vertical right 2 block 124 and vertical right 3 block 126. Correspondingly on the black side of the diagram vertical left 3 block 128 is indicative of a vertical left 3 correlation and the output of a vertical left 3 intermediate code word. Similarly, the same is true for vertical left 2 block 130, vertical left 1 block 132, vertical 0 block 134, vertical right 1 block 136, vertical right 2 block 138 and vertical right 3 block 140. Notice that both block 114 and block 128 produce a vertical left 3 output word, block 114 corresponding to a vertical left 3 correlation when a color change occurs from white to black and block 128 indicative of a vertical left 3 correlation with a color change from black to white. As described above where no vertical correlation exists, pass code blocks 142 and 144 provide the outputting of an intermediate code indicative of a pass code situation. After encountering state run length white 94, either block 146 or block 148 is encountered. In block 146 the horizontal run length mode is set to 1, while in block 148 the horizontal run length mode is set to 0. Similarly after encountering run length black state 110, either block 150 is encountered which sets horizontal run length mode to 1 or block 152 which sets horizontal run length mode to 0. Following either block 146 or 148, a run length white block 154 is encountered during which a run length white code is outputted. Similarly block 156 provides the outputting of a run length black code following either block 150 or block 152. When the counter 70 in FIG. 4 reaches the predetermined number of picture elements in a given line, an end of line signal is provided to the state machine and the state machine is forced through block 158 outputting an end of line code per the CCITT specifications.

Each new line of encoding begins by forcing all prior states to white and beginning in start white state 80. If no color change occurs within the current picture element 40 during the scan of the entire line before the end of line signal is reached, a color change is forced so that an output code may be given. This case would occur where a given line of an information bearing document was all white.

Figure 5A:
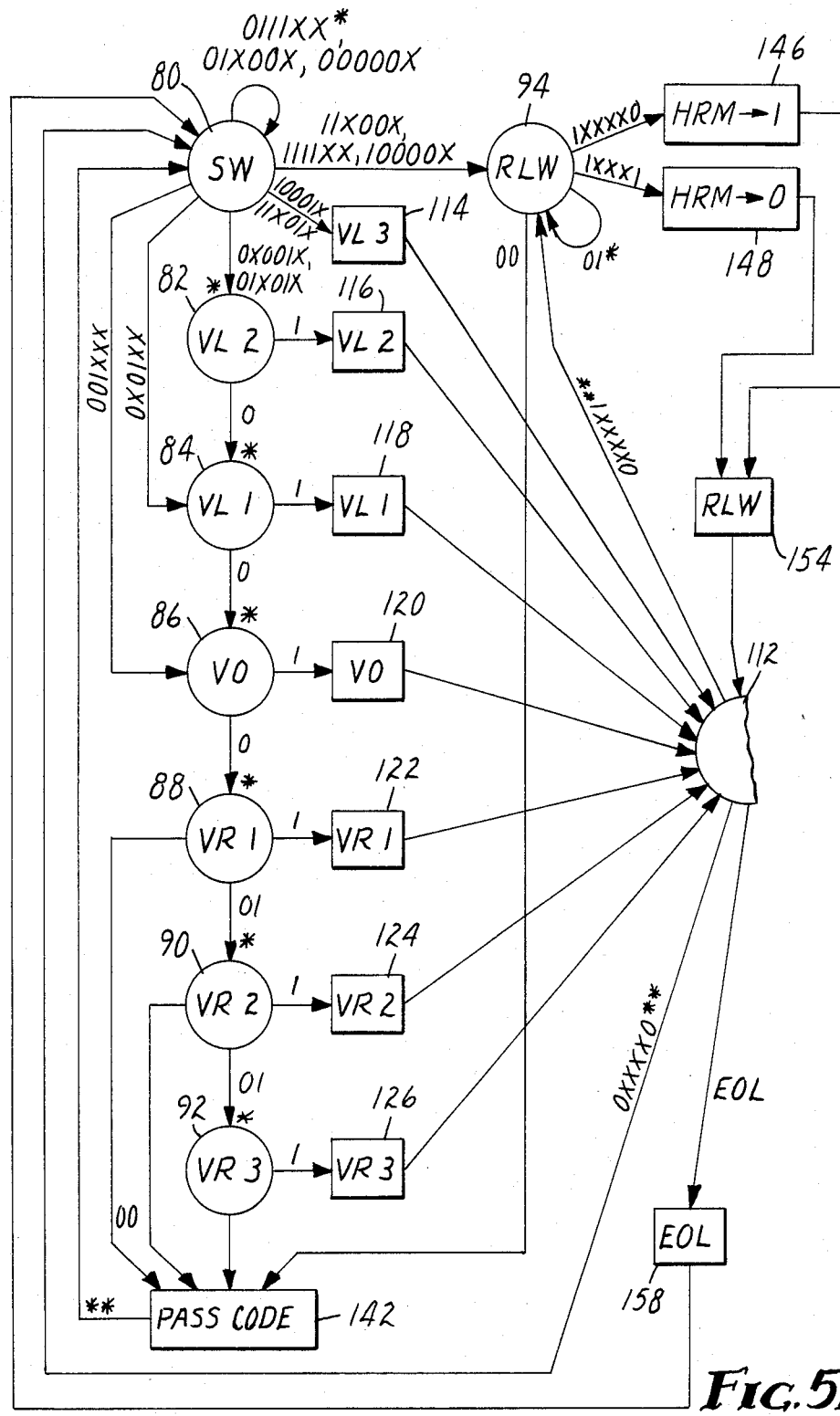
FIGS. 5A and 5B describe a detailed state diagram of the state machine of the present invention.
Figure 5B:
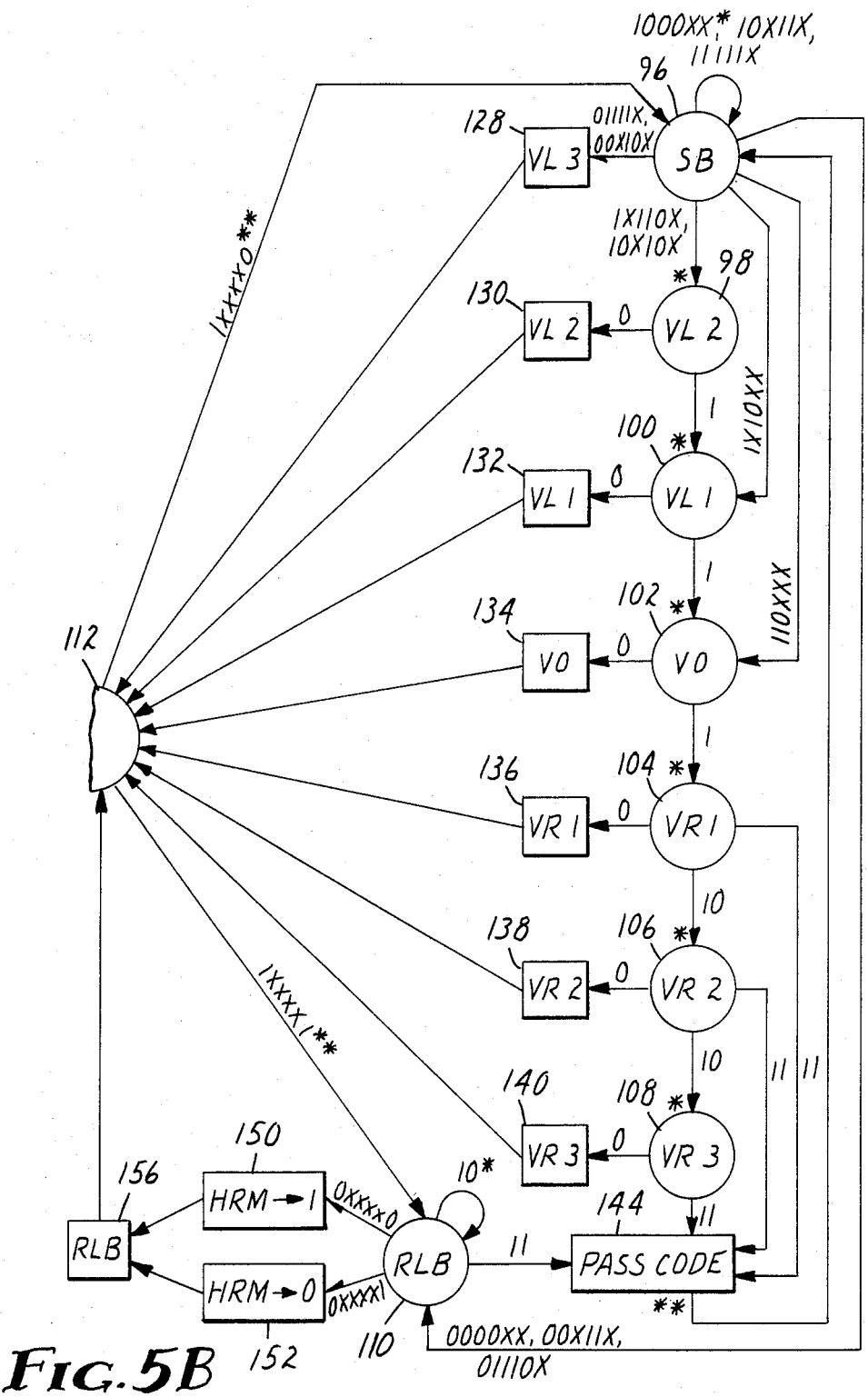

A state machine illustrated in FIGS. 5A and 5B is, of course, only indicative of a variety of state machines which could be constructed to follow the principles of the present invention. The particular state machine illustrated in FIGS. 5A and 5B could be implemented in a number of ways and varieties by one with ordinary skill in the art. The state diagram adequately defines a given functional circuit which a logic designer could translate into particular hardware components. In a preferred embodiment it is preferred that the state machine be implemented with a standard programmed logic array (PAL) such as Model 16R8 manufactured by Monolithic Memories of Sunnyvale, Calif. The particular equations utilized for programming such an array for the particular state diagram illustrated in FIGS. 5A and 5B are described in Table I.

TABLE I

```
CLK IN1 IN2 IN3 IN4 CPP CNTRESET LD1630 STARTLINE GND GND
1-DENABLE TXRQ COLORST STLDLY FF4 FF3 FF2 FF1 VCC
/FF1 := IN1*TXRQ*/FF1 + IN1*TXRQ*FF2 + IN1*TXRQ*FF3 +
IN1*TXRQ*FF4 + /FF1*/TXTQ*/CNTRESET + CNTRESET*1-
DENABLE*STLDLY*/TXRQ + FF1*/FF2*/FF3*/FF4*/CNTRESET*/TXRQ
/FF2 := IN2*TXRQ*/FF1 + IN2*TXRQ*FF2 + IN2*TXRQ*FF3 +
IN2*TXRQ*FF4 + /FF2*/TXRQ*/CNTRESET + CNTRESET*STLDLT*/TXRQ
+ FF1*/FF2*/FF3*/FF4
/FF3 := IN3*TXRQ*/FF1 + IN3*TXRQ*FF2 + IN3*TXRQ*FF3 +
IN3*TXRQ*FF4 + FF3*/TXRQ*/CNTRESET + CNTRESET*STLDLY*/TXRQ
+ FF1*/FF2*/FF3*/FF4
/FF4: = IN4*TXRQ*/FF1 + IN4*TXRQ*FF2 + IN4*TXRQ*FF3 +
```

TABLE I-continued

```
IN4*TXRQ*FF4 + /FF4*/TXRQ*/CNTRESET + CNTRESET*STLDLY*/TXRQ
+ FF1*/FF2*/FF3*/FF4
/STLDLY := /STARTLINE
/COLORST := /CPP + /STARTLINE
/TXRQ := CCP*/COLORST*STARTLINE + /CCP*COLORST*STARTLINE +
/TXRQ*/CNTR + IN4*/IN3*/IN2*IN1*/CNTRESET*/FF1*LD1630
+ IN4*/IN3*/IN2*IN1*/CNTRESET*FF2*LD1630 +
IN4*/IN3*/IN2*IN1*/CNTRESET*FF3*LD1630 + IN4*/IN3*/IN2*IN1/
CNTRESET*FF4*LD1630
/1-DENABLE := IN4*/IN3*/IN2*/IN1*/CNTRESET*STARTLINE*TXRQ +
/FF4*FF3*F*FF1*STARTLINE + /FF4*/FF3*/FF2*FF1*/CNTRESET*
STARTLINE + /FF4*/FF3*/FF2*FF1*TXRQ*STARTLINE
```

DESCRIPTION

FF1–FF4 generate the 2-D state outputs. FF4 is the most significant bit. The 2-D states read are 14-VL2, 13-VL1, 12-VO, 11-VR1, 10-VR2, 9-VR3, 8-VL3, 6-PASS. States used internally and not read are 0- RESTART COLOR, 7-RUN LENGTH and 1-HORIZONTAL RUN LENGTH MODE set. States 7 and 1 are implied when the run length counts are read during a 2-D mode operation.

STLDLY allows for the FF1–FF4 RESTATR COLOR state at the end of a line where START LINE has gone inactive.

COLOR STATE is the current pel color delayed by 1 PAL clock. This is an input of the exclusive or condition that generates a code transfer request (TXRQ). The color state is forced white during START LINE inactive low. As CCITT specified, all lines must start out white. TXRQ generates a code transfer request. The first 2 terms are an exclusive or combination of the COLORST and CPP (current line pel color). This covers all the codes where there is a code transfer due to a color change on the current line. The last 4 terms generate a transfer request for the PASS code. This occurs when there is not a color change on the current line, but there has been a color transition to the opposite color and back on the history line. The third term resets TXRQ.

1-DENABLE is set for the RUN LENGTH and HORIZONTAL RUN LENGTH MODE.

The following is the 512×8 prom addressing and outputs (truth table) used in the 2-D state machine portion of the encoder board. The addressing cooresponds to:

A0 - HP3, History PEL 3 of the 2-D state window (see note below).
A1 - HP2, History PEL 2
A2 - HP1, History PEL 1
A3 - HP, History PEL 0
A4 - Flip flop 1 (FF1) output of PAL16R8. This is feedback and also the least significant bit of the 2-D state code read into memory by the D.M.A. when there is a color transition on the current line.
A5 - FF2 of 16R8, and bit 1 of 2-D state code.
A6 - FF3 of 16R8, and bit 2 of 2-D state code.
A7 - Current line PEL(CP).
A8 - Color state (CP delayed by 1 PAL clocking).

| A3-A0= | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A7-A4 A8 | | | | | | | | | | | | | | | | |
| 0000 | FF | 01 | 02 | 02 | 03 | 03 | 03 | 03 | FF | 01 | 02 | 02 | FF | 01 | FF | FF |
| 0010 | 09 | 09 | 09 | 09 | 09 | 09 | 09 | 09 | 08 | 08 | 08 | 08 | 08 | 08 | 08 | 08 |
| 0020 | 09 | 09 | 09 | 09 | 09 | 09 | 09 | 09 | 06 | 06 | 06 | 06 | 06 | 06 | 06 | 06 |
| 0030 | 09 | 09 | 09 | 09 | 09 | 09 | 09 | 09 | 05 | 05 | 05 | 05 | 05 | 05 | 05 | 05 |
| 0040 | 04 | 04 | 04 | 04 | 04 | 04 | 04 | 04 | 04 | 04 | 04 | 04 | 04 | 04 | 04 | 04 |
| 0050 | 03 | 03 | 03 | 03 | 03 | 03 | 03 | 03 | 03 | 03 | 03 | 03 | 03 | 03 | 03 | 03 |
| 0060 | 02 | 02 | 02 | 02 | 02 | 02 | 02 | 02 | 02 | 02 | 02 | 02 | 02 | 02 | 02 | 02 |
| 0070 | 09 | 09 | 09 | 09 | 09 | 09 | 09 | 09 | 08 | 08 | 08 | 08 | 08 | 08 | 08 | 08 |
| 0080 | 08 | 07 | 08 | 08 | 08 | 08 | 08 | 08 | 08 | 07 | 08 | 08 | 08 | 07 | 08 | 08 |
| 0090 | 06 | 06 | 06 | 06 | 06 | 06 | 06 | 06 | 06 | 06 | 06 | 06 | 06 | 06 | 06 | 06 |
| 00A0 | 05 | 05 | 05 | 05 | 05 | 05 | 05 | 05 | 05 | 05 | 05 | 05 | 05 | 05 | 05 | 05 |
| 00B0 | 04 | 04 | 04 | 04 | 04 | 04 | 04 | 04 | 04 | 04 | 04 | 04 | 04 | 04 | 04 | 04 |
| 00C0 | 03 | 03 | 03 | 03 | 03 | 03 | 03 | 03 | 03 | 03 | 03 | 03 | 03 | 03 | 03 | 03 |
| 00D0 | 02 | 02 | 02 | 02 | 02 | 02 | 02 | 02 | 02 | 02 | 02 | 02 | 02 | 02 | 02 | 02 |
| 00E0 | 01 | 01 | 01 | 01 | 01 | 01 | 01 | 01 | 01 | 01 | 01 | 01 | 01 | 01 | 01 | 01 |
| 00F0 | 08 | 08 | 08 | 08 | 08 | 08 | 08 | 08 | 08 | 08 | 08 | 08 | 08 | 08 | 08 | 08 |
| 0100 | 08 | 08 | 07 | 08 | 08 | 08 | 07 | 08 | 08 | 08 | 08 | 08 | 08 | 08 | 07 | 08 |
| 0110 | 06 | 06 | 06 | 06 | 06 | 06 | 06 | 06 | 06 | 06 | 06 | 06 | 06 | 06 | 06 | 06 |
| 0120 | 05 | 05 | 05 | 05 | 05 | 05 | 05 | 05 | 05 | 05 | 05 | 05 | 05 | 05 | 05 | 05 |
| 0130 | 04 | 04 | 04 | 04 | 04 | 04 | 04 | 04 | 04 | 04 | 04 | 04 | 04 | 04 | 04 | 04 |
| 0140 | 03 | 03 | 03 | 03 | 03 | 03 | 03 | 03 | 03 | 03 | 03 | 03 | 03 | 03 | 03 | 03 |
| 0150 | 02 | 02 | 02 | 02 | 02 | 02 | 02 | 02 | 02 | 02 | 02 | 02 | 02 | 02 | 02 | 02 |
| 0160 | 01 | 01 | 01 | 01 | 01 | 01 | 01 | 01 | 01 | 01 | 01 | 01 | 01 | 01 | 01 | 01 |
| 0170 | 08 | 08 | 08 | 08 | 08 | 08 | 08 | 08 | 08 | 08 | 08 | 08 | 08 | 08 | 08 | 08 |
| 0180 | FF | FF | 01 | FF | 02 | 02 | 01 | FF | 03 | 03 | 03 | 03 | 02 | 02 | 01 | FF |
| 0190 | 08 | 08 | 08 | 08 | 08 | 08 | 08 | 08 | 09 | 09 | 09 | 09 | 09 | 09 | 09 | 09 |
| 01A0 | 06 | 06 | 06 | 06 | 06 | 06 | 06 | 06 | 09 | 09 | 09 | 09 | 09 | 09 | 09 | 09 |
| 01B0 | 05 | 05 | 05 | 05 | 05 | 05 | 05 | 05 | 09 | 09 | 09 | 09 | 09 | 09 | 09 | 09 |
| 01C0 | 04 | 04 | 04 | 04 | 04 | 04 | 04 | 04 | 04 | 04 | 04 | 04 | 04 | 04 | 04 | 04 |

-continued

| | | | | | | | | | | | | | | | | |
|---|---|---|---|---|---|---|---|---|---|---|---|---|---|---|---|---|
| 01D0 | 03 | 03 | 03 | 03 | 03 | 03 | 03 | 03 | 03 | 03 | 03 | 03 | 03 | 03 | 03 | 03 |
| 01E0 | 02 | 02 | 02 | 02 | 02 | 02 | 02 | 02 | 02 | 02 | 02 | 02 | 02 | 02 | 02 | 02 |
| 01F0 | 08 | 08 | 08 | 08 | 08 | 08 | 08 | 08 | 09 | 09 | 09 | 09 | 09 | 09 | 09 | 09 |

Definition of Outputs:
FF  - Restart
09  - Pass State
08  - Run Length State
07  - Vertical Left 3
06  - Vertical Right 3
05  - Vertical Right 2
04  - Vertical Right 1
03  - Vertical 0
02  - Vertical Left 1
01  - Vertical Left 2

Thus, it can be seen that there has been shown and described a novel apparatus for producing a code word. It is to be understood that various changes, modifications and substitutions in the form and details of the described apparatus can be made by those skilled in the art without departing from the scope of the invention as defined by the following claims.

What is claimed is:

1. An apparatus for producing a code word, said apparatus responsive to the binary information content in an information bearing document defined by a predetermined number of picture elements in each of a plurality of horizontal lines in said document, said apparatus receiving said binary information content sequentially from said picture elements in each one of said plurality of lines and sequentially through said plurality of lines, said code word being indicative of the vertical correlation between a change in the binary information content of sequential picture elements in a current one of said plurality of lines with a change in the binary information content of said picture elements in a prior one of said plurality of lines, comprising:

picture element counting means receiving said binary information content, said picture element counting means for counting said predetermined number of picture elements;

memory means operatively coupled to said picture element counting means, said memory means for storing the binary information content of said predetermined number of picture elements in said prior one of said plurality of lines;

a state machine receiving as inputs the binary information content of a current one of said predetermined number of picture elements and operatively coupled to said memory means, said state machine for determining a change in the binary information content of said predetermined number of picture element in said prior one of said plurality of lines and for moving from state to state depending upon the vertical correlation of said change binary information content in said prior one of said plurality of lines with a change in the binary information content in the line containing said current one of said predetermined number of picture elements; and output means responsive to said state machine, said output means for outputting said code word depending upon the vertical correlation of a change in the binary information content of said picture elements between said prior one of said plurality of lines and the line containing said current one of said predetermined number of picture elements;

said state machine being responsive as current inputs only to said current one of said predetermined number of picture elements, to the binary information content of a corresponding one of said picture elements in said prior one of said plurality of lines corresponding to said current one of said predetermined number of picture elements and to the binary information content of picture elements in said prior one of said plurality of lines which are sequentially ahead of said corresponding one of said picture elements, said state machine using said current inputs to determine its internal state and using said current inputs and its internal state to determine said code word.

2. An apparatus as in claim 1 wherein said state machine is responsive to a vertical correlation of within a predetermine number of picture elements defined as a window.

3. An apparatus as in claim 2 wherein said output means outputs a pass code indicative of the lack of vertical correlation in a change in the binary information content within the limits of said window.

4. An apparatus as in claim 3 wherein said output means outputs a run length code indicative of a vertical correlation of a change in the binary information content which is outside the limits of said windows.

5. An apparatus as in claim 4 wherein said prior one of said plurality of lines is the line immediately sequentially preceeding the line containing said current one of said predetermined number of picture elements.

6. An apparatus as in claim 5 wherein said predetermined number of said picture elements is the same for each of said plurality of lines.

7. An apparatus as in claim 2 wherein said predetermined number of picture elements in said window is seven, namely a corresponding one in said prior one of said plurality of lines corresponding to said current one of said predetermined number of picture elements and three picture elements on either side of said corresponding one of picture elements in said prior one of plurality of lines.

8. An apparatus for producing a code word responsive to the binary information content in a picture defined by a predetermined number of picture elements in each of a plurality of lines in said picture, said code word indicative of the vertical correlation between a change in the binary information content of sequential picture elements in one of said plurality of lines and a change in the binary information content of said picture elements in a previous one of said plurality of lines, comprising:

scanning means for sequentially scanning said predetermined number of said picture elements in each of said plurality of lines and for producing an output indicative of the binary information content thereof;

picture element counting means operatively coupled to said scanning means, said picture element counting means for counting the number of the current one of said predetermined number of picture elements;

memory means operatively coupled to said picture element counting means, said memory means for storing the binary information previous line;

a state machine receiving as inputs the binary information content of said current one of said predetermined number of picture elements and the binary information content of a picture element vertically correlated to said current one of said predetermined number of picture elements in said previous line as well as the binary information content of at least one picture element subsequent to said vertically correlated picture element in the direction of scanning of said scanning means, said state machine remembering the information content of at least one picture element prior to said correlated picture element in the direction of scanning of said scanning by moving from state to state depending upon the vertical correlation of a change in the information content of said picture elements; and output means responsive to said state machine, said output means for outputting said code word depending upon said vertical correlation of a change in the binary information content of said picture elements;

said state machine being responsive as current inputs only to said current one of said predetermined number of picture elements, to the binary information content of a corresponding one of said picture elements in said prior one of said plurality of lines corresponding to said current one of said predetermined number of picture elements and to the binary information content of picture elements in said prior one of said plurality of lines which are sequentially ahead of said corresponding one of said picture elements, said state machine using said current inputs to determine its internal state and using said current inputs and its internal state to determine said code word.

* * * * *